Patented June 12, 1945

2,377,966

UNITED STATES PATENT OFFICE 2,377,966

STABILIZATION OF MONOETHANOLAMINE SOLUTIONS

Robert M. Reed, Louisville, Ky., assignor to The Girdler Corporation, Louisville, Ky., a corporation of Delaware No Drawing. Application April 10, 1943,
Serial No. 482,621

6 Claims. (Cl. 23—150)

This invention relates to an improved method for stabilizing aqueous monoethanolamine solutions used for separating carbon dioxide from gaseous mixtures, and particularly to prevent corrosion of iron apparatus in which such solutions are used.

Aqueous solutions of monoethanolamine are widely used for separating carbon dioxide from other gases. The carbon dioxide contained in a gaseous mixture (such as flue gas) is absorbed in the aqueous monoethanolamine solution, after which it is separated from the solution by boiling, and may be recovered in pure form if desired. The monoethanolamine solution is then cooled and used for absorbing further quantities of carbon dioxide in a cyclic process.

Monoethanolamine is susceptible to oxidation under certain conditions, and may be converted to aminoacetic acid as shown by the following reaction:

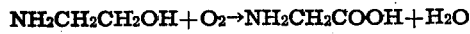

$$NH_2CH_2CH_2OH + O_2 \rightarrow NH_2CH_2COOH + H_2O$$

Aminoacetic acid is corrosive toward metallic iron when present in monoethanolamine solutions containing carbon dioxide. Consequently, monoethanolamine solutions may become corrosive as a result of oxidation occurring when the solution contacts gases containing oxygen, as is usually the case. Such corrosion of iron equipment may occur to a highly undesirable extent when a sufficient quantity of aminoacetic acid has accumulated in the monoethanolamine solution.

The corrosive effect of aminoacetic acid in monoethanolamine solutions is shown by the following example:

Fifteen milliliters of a 13% aqueous solution of monoethanolamine were heated in an autoclave for 20 hours at 100° C. under thirty pounds gauge pressure of carbon dioxide with six grams of iron wire. At the end of the test the iron wire was found to have lost 0.06% of its weight. Under the same conditions, iron wire immersed in a 13% aqueous solution of monoethanolamine containing 2% of aminoacetic acid lost 0.82% of its weight in 20 hours.

An aqueous monoethanolamine solution which has become corrosive after being used for removing carbon dioxide from gases containing oxygen will dissolve iron from equipment on being heated when it is saturated with carbon dioxide. The dissolved iron will be precipitated from the solution when it is boiled, so that the carbon dioxide is released from it, and the solution will dissolve more iron when it again is heated after being resaturated with carbon dioxide. By this cyclic action, a rapid corrosion of equipment may occur.

I have found that this corrosive condition in aqueous monoethanolamine solutions used for separating carbon dioxide from other gases may be prevented by the addition of copper to the solution. This may be accomplished by adding copper salts such as copper sulphate or copper carbonate to the solution, or by placing metallic copper in contact with the solution so that it will dissolve therein. The aqueous monoethanolamine assumes a bluish or greenish color after copper has dissolved in it, presumably due to the presence of complexes similar to those present when copper salts are dissolved in ammoniacal solutions. This protective effect of dissolved copper is unexpected, since it is well known that copper is an oxidation catalyst for many organic compounds. The quantity of dissolved copper required to prevent an aqueous monoethanolamine solution from dissolving iron when saturated with carbon dioxide is relatively small. As long as enough copper is present to give the solution a bluish or greenish color, no corrosion of iron equipment will occur. As little as 50 parts per million by weight of dissolved copper in the solution is sufficient to accomplish the desired purpose. Ordinarily the copper content of the solution will be maintained at 500 to 600 parts per million.

The effect of the dissolved copper appears to be two-fold. If copper is dissolved in an aqueous monoethanolamine solution to which enough aminoacetic acid has been added to make it corrosive toward iron, the solution will no longer dissolve iron, so that the copper exerts a specific action in preventing aminoacetic acid from dissolving iron. The same protective effect is obtained when copper is dissolved in an aqueous monoethanolamine solution which has been employed for removing carbon dioxide from other gases, and which has become oxidized to such an extent that it has begun to dissolve iron from the equipment in which it is used. This effect is shown by the following example:

An 8% aqueous monoethanolamine solution which had been employed for recovering carbon dioxide from boiler stack gas for a period of 18 months had oxidized to the extent that it was corrosive toward iron when saturated with carbon dioxide. This solution contained 150 parts per million of dissolved iron and was brown in color. On being saturated with carbon dioxide and heated with iron filings, the dissolved iron content rose to 2,250 parts per million. After dissolving 575 parts per million of copper (added as basic copper carbonate) in the solution containing 150 parts per million of dissolved iron, the solution was saturated with carbon dioxide and heated with iron filings. In this case, the dissolved iron content of the solution decreased to 100 parts per million.

The second effect produced in an aqueous monoethanolamine solution by the addition of dissolved copper is to promote the formation of oxalic acid. Oxalic acid is an oxidation product of both monoethanolamine and aminoacetic acid:

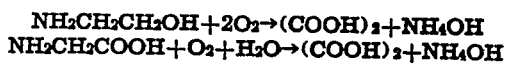

In the absence of copper, oxidized monoethanolamine solutions do not contain appreciable quantities of oxalic acid, but aqueous monoethanolamine solutions containing dissolved copper will gradually accumulate oxalic acid until the solution becomes saturated with oxolate. It appears likely that copper promotes the oxidation of aminoacetic acid to oxalic acid in monoethanolamine solutions. Since oxalic acid is less corrosive toward iron than aminoacetic acid, the conversion of aminoacetic acid to oxalic acid lessens the tendency of the oxidized monoethanolamine solution to be corrosive.

The stabilizing effect of dissolved copper on aqueous monoethanolamine solutions used for recovering carbon dioxide from gaseous mixtures has been proven on a large scale installation. In this case, oxidation of the monoethanolamine solution was very severe, and the solution became corrosive in from four to six weeks time, after which it was necessary to replace the solution to avoid loss of iron equipment. After 500 parts per million of dissolved copper were added to a fresh charge of monoethanolamine solution, the plant was operated for three months with no corrosion of the iron equipment occurring.

Having thus described my invention, what I claim as new and desire to secure by Letters Patent is:

1. In the process of separating carbon dioxide from gaseous mixtures by contacting such gases with an aqueous solution of monoethanolamine, the step of stabilizing the monoethanolamine solution to prevent corrosion of iron equipment containing it by maintaining dissolved copper in the monoethanolamine solution.

2. In the process of separating carbon dioxide from gaseous mixtures containing it by contacting such gases with an aqueous solution of monoethanolamine, the step of stabilizing the monoethanolamine solution to prevent corrosion of iron equipment containing it by adding sufficient copper salts thereto to maintain dissolved copper in the solution.

3. In the process of separating carbon dioxide from gaseous mixtures containing it by contacting such gases with an aqueous solution of monoethanolamine, the step of stabilizing the monoethanolamine solution to prevent corrosion of iron equipment containing it by placing sufficient metallic copper in contact with the monoethanolamine solution to maintain dissolved copper in the solution.

4. In the process of separating carbon dioxide from gaseous mixtures containing it by contacting such gases with an aqueous solution of monoethanolamine, the step of reclaiming solutions which have become corrosive to iron equipment and preventing further corrosion by adding thereto and maintaining dissolved cooper in the monoethanolamine solution.

5. In the process of separating carbon dioxide from gaseous mixtures containing it by contacting such gases with an aqueous solution of monoethanolamine, the step of reclaiming solutions which have become corrosive to iron equipment and preventing further corrosion by adding thereto sufficient copper salts to maintain dissolved copper in the monoethanolamine solution.

6. In the process of separating carbon dioxide from gaseous mixtures containing it by contacting such gases with an aqueous solution of monoethanolamine, the step of reclaiming solutions which have become corrosive to iron equipment and preventing further corrosion by placing sufficient metallic copper in contact with the monoethanolamine solution to maintain dissolved copper in the solution.

ROBERT M. REED.